(12) United States Patent
Lee

(10) Patent No.: US 7,028,634 B1
(45) Date of Patent: Apr. 18, 2006

(54) WORKLIGHT WITH THERMAL WARNING

(75) Inventor: Wade Lee, Danville, CA (US)

(73) Assignee: EML Technologies LLC, Danville, CA (US)

( * ) Notice: Subject to any disclaimer, the term of this patent is extended or adjusted under 35 U.S.C. 154(b) by 288 days.

(21) Appl. No.: 09/891,484

(22) Filed: Jun. 25, 2001

(51) Int. Cl.
  *G01D 21/00* (2006.01)
(52) U.S. Cl. ............... 116/207; 116/216; 374/162
(58) Field of Classification Search ............ 116/207, 116/216; 374/162, 161
See application file for complete search history.

(56) References Cited

U.S. PATENT DOCUMENTS

| | | | | |
|---|---|---|---|---|
| 339,247 A | * | 4/1886 | Virnoche | |
| 1,676,536 A | * | 7/1928 | Ferkel | 374/162 |
| 1,692,012 A | * | 11/1928 | Wells | 116/216 |
| 3,827,301 A | * | 8/1974 | Parker | 73/356 |
| 3,877,411 A | * | 4/1975 | MacDonald | 116/207 |
| 3,893,340 A | * | 7/1975 | Parker | 73/356 |
| 4,333,339 A | * | 6/1982 | McNeely et al. | 374/139 |
| 4,339,951 A | * | 7/1982 | Yee et al. | 374/162 |
| 4,421,560 A | * | 12/1983 | Kito et al. | 106/31.2 |
| 4,554,565 A | * | 11/1985 | Kito et al. | 503/201 |
| 4,717,710 A | | 1/1988 | Shimizu et al. | 503/213 |
| 4,919,983 A | | 4/1990 | Fremin | 428/35.7 |
| 4,957,949 A | | 9/1990 | Kamada et al. | 523/201 |
| 4,983,810 A | * | 1/1991 | Balderson | 219/445.1 |
| 5,076,708 A | * | 12/1991 | Pierson | 374/144 |
| 5,223,958 A | * | 6/1993 | Berry | 359/43 |
| 5,431,697 A | | 7/1995 | Kamata et al. | 8/483 |
| 5,482,373 A | * | 1/1996 | Hutchinson | 374/141 |
| 5,499,597 A | * | 3/1996 | Kronberg | 116/216 |
| 5,520,385 A | * | 5/1996 | Quigley et al. | 473/562 |
| D375,377 S | * | 11/1996 | Leen | D26/63 |
| 5,720,555 A | | 2/1998 | Elele | 374/150 |
| 5,997,964 A | * | 12/1999 | Klima, Jr. | 428/1.54 |
| 6,104,007 A | * | 8/2000 | Lerner | 219/445.1 |
| 6,174,319 B1 | | 1/2001 | Desnos | 606/133 |

(Continued)

FOREIGN PATENT DOCUMENTS

DE    EPO 535 563 A1  *  9/1991

(Continued)

OTHER PUBLICATIONS

Telatemp (Fullerton, CA), website info on "Hot Hand Label", (Oct. 12, 1999).*

*Primary Examiner*—G. Bradley Bennett
*Assistant Examiner*—Tania Courson
(74) *Attorney, Agent, or Firm*—Elliot B. Aronson

(57) ABSTRACT

An enhanced built-in visual warning mechanism to caution a user when the surfaces of a worklight are hot. A worklight is shown that has a housing that includes an interior portion for holding a light source such as one or more quartz halogen bulbs. The light source operates at a temperature sufficient to raise at least portions of the exterior surfaces of the housing to a temperature that is hot to human touch during normal operation of the worklight. A thermochromic substance is disposed in thermal communication with at least a portion of one of the exterior housing surfaces in a readily visible position. The thermochromic substance is formulated to undergo a conspicuous color change, in the normal operation of the worklight, in response to heat from the external surface where it is located. The dynamic color change provides a timely visible indication to the user that the exterior surface is presently hot to the touch. In some embodiments a thermal moderator is introduced between the hot worklight surface and the thermochromic substance to moderate the heat level applied to the thermochromic substance.

5 Claims, 2 Drawing Sheets

U.S. PATENT DOCUMENTS

| | | | |
|---|---|---|---|
| 6,241,289 B1 | 6/2001 | Kulper et al. | 283/86 |
| 6,500,555 B1 * | 12/2002 | Khaldi | 428/457 |
| 6,586,751 B1 * | 7/2003 | Pichon et al. | 250/474.1 |
| 6,639,190 B1 * | 10/2003 | Lerner | 219/445.1 |
| 2002/0043261 A1 * | 4/2002 | Leutner et al. | 126/388.1 |
| 2002/0097777 A1 * | 7/2002 | Ronci | 374/157 |

FOREIGN PATENT DOCUMENTS

| | | | |
|---|---|---|---|
| GB | 2348703 A | * | 10/2000 |
| JP | 357059129 A | * | 4/1982 |

* cited by examiner

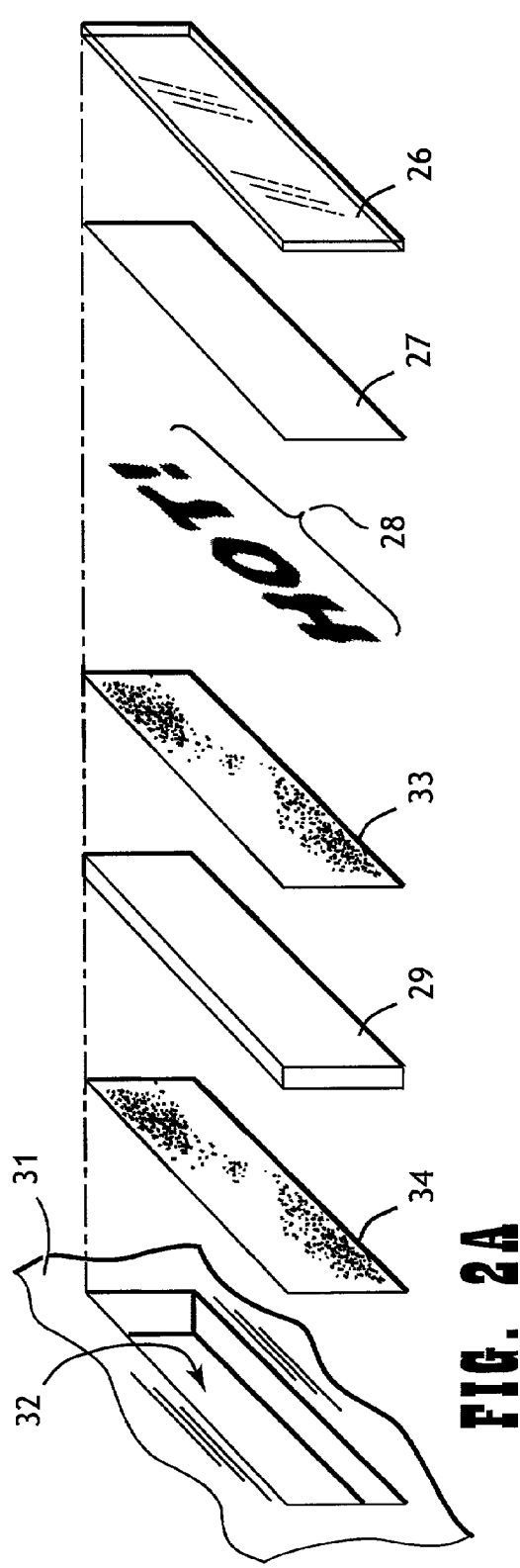
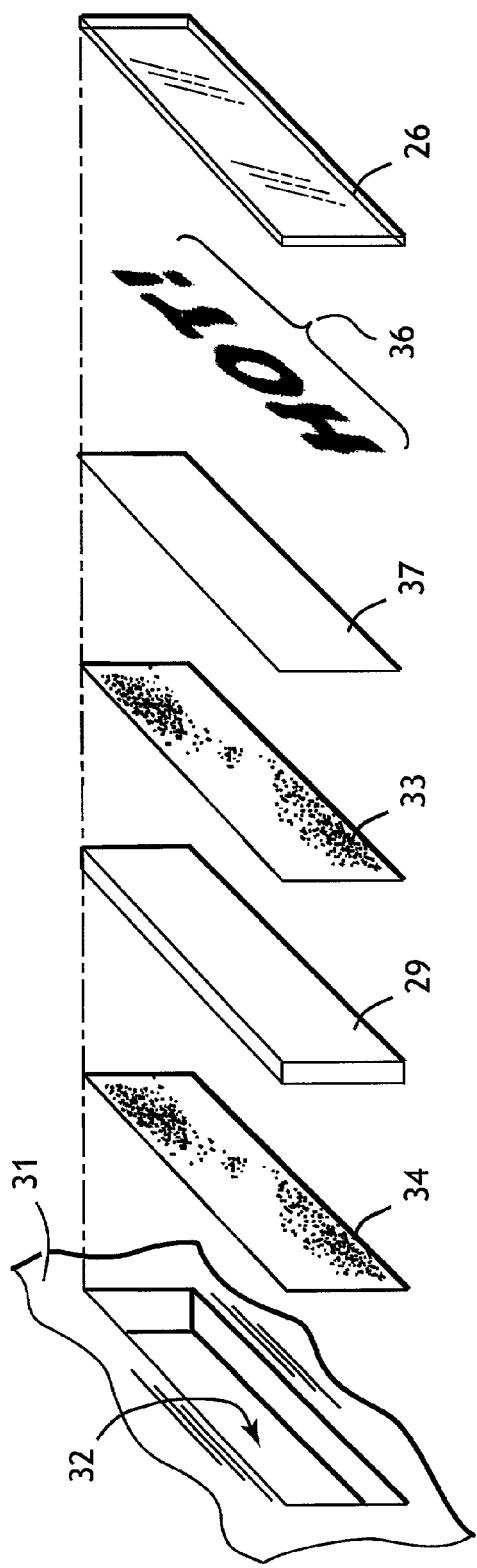

WORKLIGHT WITH THERMAL WARNING

BACKGROUND OF THE INVENTION

The present invention relates to worklights such as quartz halogen worklights that operate at a comparatively hot temperature.

Quartz halogen worklights are used in a variety of settings such as construction sites, industrial plants, automotive and auto body repair shops, artist and photographic studios, and around the home for do-it-yourself projects. These lights provide a high level of illumination over an extended area. The quartz halogen bulbs, however, have a comparatively high operating temperature, and consequently the exterior surfaces of the worklights tend to get hot. Some worklight manufacturers apply a printed label to a prominent surface of the worklight warning of a potential risk of fire or injury and warning to keep the unit away from combustibles; others additionally print a "hot surface" reminder warning on the label; yet others give no specific warning at all and rely instead on the general astuteness of the user to recognize and appreciate the inherent hotness of the worklight surfaces during and for a short duration following use.

SUMMARY OF THE INVENTION

The present invention provides an enhanced built-in warning mechanism to caution the user when worklight surfaces are hot. A worklight incorporating the invention typically has a housing that includes an interior portion for holding a light source such as one or more quartz halogen bulbs. The light source operates at a temperature sufficient to raise at least portions of the exterior surfaces of the housing to a temperature that is hot to human touch during normal operation of the worklight. Briefly, the invention includes a thermochromic substance in thermal communication with at least a portion of one of the exterior housing surfaces in a readily visible position. The thermochromic substance is formulated to undergo a conspicuous color change, in the normal operation of the worklight, in response to heat from the external surface where it is located. Unlike the passive warning labels of the prior art, the dynamic color change provides a timely visible indication to the user that the exterior surface is presently hot to the touch.

In one cost-effective embodiment a thermochromic layer such as a band of thermochromic ink is applied to the underside of a transparent substrate. Warning indicia, such as a cautionary legend or symbol, are printed in non-thermochromic ink on the underside of the thermochromic layer. The substrate is then adhered to a thermal moderator material and the assembly is secured to the worklight surface. At room temperature the thermochromic layer is opaque and obscures the cautionary warning. As the worklight operating temperature is approached, heat is conducted through the thermal moderator material to the thermochromic layer, which turns transparent to reveal the cautionary warning. The thermal moderator in this embodiment enables the use of thermochromic inks of lower activation temperature and provides for more uniform color change over the thermochromic layer.

Various aspects, advantages, and novel features of the invention are described below or will be readily apparent from the following specifications and drawings of illustrative embodiments.

BRIEF DESCRIPTION OF THE DRAWINGS

FIGS. 2A and 2B are exploded views of alternative embodiments of the thermal warning arrangement of FIG. 1.

DETAILED DESCRIPTION OF ILLUSTRATIVE EMBODIMENTS

Figure 1:
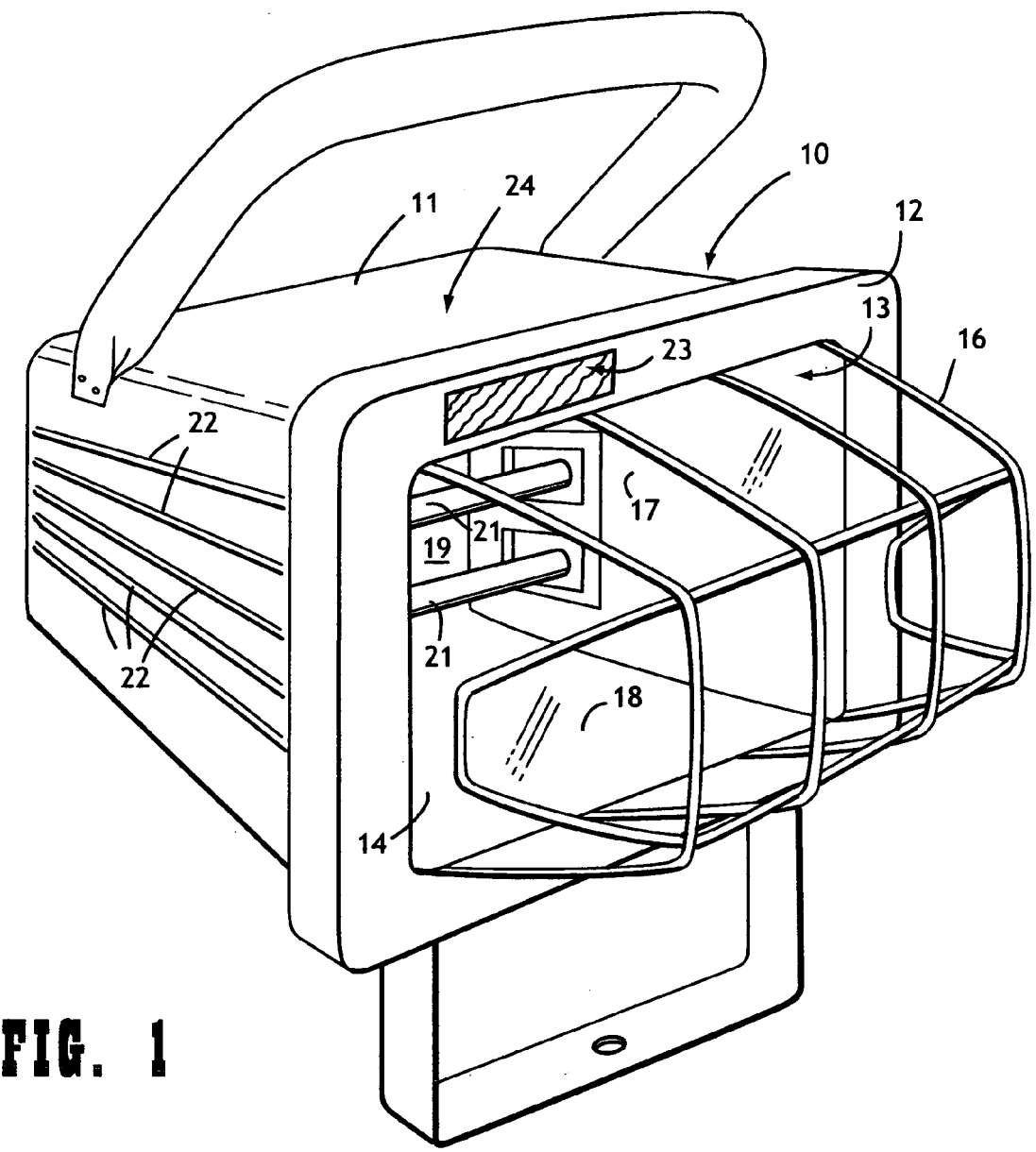
FIG. 1 is a perspective view of a worklight showing a thermal warning arrangement according to the invention.

An embodiment of the invention will now be described as incorporated into a popular form of quartz halogen worklight. The worklight, illustrated in FIG. 1, is formed with a housing 10, which has a body portion 11 and a front bezel 12 defining a front exit window 13. The exit window is covered by a protective glass shield 14, in front of which extends a protective grill 16. The housing includes an interior portion formed by interior sidewall 17, bottom wall 18, back wall 19 and the opposing side and top walls, which are not visible in FIG. 1. The interior portion holds a light source, which in the embodiment of FIG. 1 is provided by a pair of tubular quartz halogen bulbs 21. These bulbs commonly have a power rating of 250 to 300 Watts each so that the worklight has a total rating of 500 to 600 Watts. In the normal operation of the worklight these bulbs generate a significant amount of heat.

Worklights such as this typically include specific measures for handling the excess heat. These may include for example minimum bulb clearances, baffles or partitions about the bulbs, cooling structures on the worklight body (such as the cooling vanes 22 visible on an exterior side wall of the worklight in FIG. 1), thermal vents in the light-bulb chamber or other regions of the worklight body, choice of materials for the walls defining the light-bulb chamber, and even the use of thermal insulation. Notwithstanding these measures, however, the exterior housing surfaces tend to become hot during the normal operation of the light. The generation of excess heat is a common enough occurrence in worklight designs that as a precaution against damage or injury, at least one major safety-certification organization requires that during normal worklight operation no exterior surface attain a temperature hotter than a prescribed maximum level.

The present invention provides an additional cautionary measure in the form of a conspicuous thermal warning indicator 23 indicating that a surface of the worklight has become potentially hazardously hot. Thermal warning indicator 23 is formed of a thermochromic substance disposed on the worklight so that it is in thermal communication with at least a portion of an exterior surface. The thermochromic substance is formulated to undergo a conspicuous color change in response to heat from the exterior surface during normal operation of the worklight at an activation temperature indicating that the exterior surface is of a temperature that is hot to the touch or that is otherwise potentially hazardous.

As used herein, "thermochromic" refers to the reversible capacity to change color in response to temperatures at or above an activation temperature. "Color change" is understood in a broad sense to include not only changes in hue, saturation and intensity, but also changes in opacity, and may include for example a change between completely opaque and completely clear. The capacity to change color is reversible in the sense that the color returns to its initial color when the temperature returns to its initial, subactivation level. The characteristic color change will generally occur as the temperature varies over a transition range beginning at the activation temperature. For the purposes of the present invention the color change may take place quickly over a narrow transition range or more gradually over a broader transition range, just so long as the transition provides an effective indication that the surface is hot.

Various formulations of thermochromic materials are available from a number of commercial suppliers. These are typically available in the form of heat-activated inks, paints or other coating compositions that change colors or disappear when they exceed a predetermined activation temperature, then change back when the temperature decreases below that same activation temperature. Thermochromic substances also include certain liquid crystal compositions but these tend to be more expensive and have lower color density and reduced selectivity in color or activation temperature, and so the thermochromic inks or coating compositions are generally preferred.

By way of example, certain thermochromic compositions are described in U.S. Pat. No. 4,717,710 to Shimizu et al.; U.S. Pat. No. 4,957,949 to Kamada et al. and U.S. Pat. No. 5,431,697 to Kamata et al., and one commercial source of thermochromic substances is Matsui International Company, Inc. of Gardena, Calif., which provides a selection of thermochromic inks as well as thermochromic paints for a variety of plastics and metals, including die cast metals, brass, ABS, polystyrene, polypropylene, polyethylene, PVC and other substrates. Of course, the thermochromic substances of the present invention are not intended to be limited only to those available from Matsui International Company. Rather, any number of commercially available thermochromic substances having activation temperatures within the desired temperature range may be used.

In the embodiment of FIG. 1 thermal warning indicator 23 is positioned on the front bezel 12 although it could also be positioned on another surface such as the top surface 24. In general, the indicator should be disposed in a readily visible location so as to give conspicuous warning to the user or others.

FIG. 2A shows a first implementation of thermal warning indicator 23. On top is a protective covering 26 of a transparent material. For the greatest visibility it is desirable that the transparent material be completely clear, although in some designs it may be desirable for the material to take on a slight tint or opacity for aesthetic purposes. In the implementation of FIG. 2A the thermochromic substance takes the form of a thermochromic layer 27 coated on the underside of covering 26, which serves here as a substrate for carrying the thermochromic substance. Thermochromic layer 27 may, for example, simply be a band of thermochromic ink printed on the underside, that is, the backside, of substrate 26. Warning indicia 28 are printed, in turn, on the underside of thermochromic layer 27 in a non-thermochromic substance. The warning indicia may take any form but will typically comprise cautionary words such as "hot surface" or "caution" and may also comprise a graphic symbol or design. To help regulate the temperature level at thermochromic layer 27, a thermal moderator 29 is interposed between the thermochromic layer and the underlying worklight surface 31. Surface 31 is formed with a recessed area 32 for receiving covering 26. The recessed area is formed so that covering 26 lies substantially flush with surface 31 when cemented or otherwise secured in position in the recessed area. Protective covering 26 and thermal moderator 29 are held in place by bonding layers 33 and 34. The flush mounting eliminates any protruding edges that might inadvertently be snagged or scraped, which could potentially damage or loosen the warning indicator. In operation, thermochromic layer 27 in the implementation of FIG. 2A is normally opaque at room temperature so as to obscure the indicia 28. As the worklight heats up and the activation temperature is reached in response to heat from the underlying surface 31, the thermochromic layer turns transparent so as to expose warning indicia 28.

FIG. 2B shows an alternative implementation in which like elements are labeled with the same reference numerals as in FIG. 2A. In FIG. 2B the warning indicia 36 are themselves formed of the thermochromic substance and printed directly onto the underside of a transparent covering plate 26 serving as a substrate for the thermochromic indicia. A non-thermochromic background layer 37 is applied over the indicia 36 onto the underside of covering 26. The thermochromic indicia are normally transparent at room temperature and change to a conspicuous color against background layer 37 as the operating temperature of the worklight surface is approached and the activation temperature of the thermochromic substance is attained.

The thermal warning indicator of the present invention may take various forms. There are a number of tradeoffs, however, in the selection of any particular thermochromic substance and in the arrangement by which thermal communication is established between the thermochromic substance and the underlying external worklight surface. For one factor, the color change may not necessarily occur uniformly over an extended thermochromic area. Sometimes, for example, the thermochromic substance can take on a blotchy or mottled appearance as the worklight surface approaches its operating temperature. This may result from such causes as uneven heating of the underlying surface, uneven heat transfer to the thermochromic substance, excessive temperature, or possibly even the formulation of the thermochromic substance itself. While such uneven color change may nevertheless provide an effective warning, it may also present an undesirable commercial impression of lesser product quality and so is generally undesirable. Another factor is the stability of the thermochromic substance above its activation temperature. For some thermochromic formulations the desired color change occurs only within a limited range above the activation temperature. If the temperature continues to rise to a level sufficiently far above the activation temperature, then the color may fade or otherwise become less conspicuous, and in some instances with repeated exposure to excessive temperatures the ability to undergo a color change may be lost altogether. Yet other factors are the selection of colors available and the cost of the thermochromic substances, as some formulations are more costly than others.

The embodiments of FIGS. 2A and 2B provide a desirable balance of these factors as well as other benefits. Transparent protective coverings 26 provide protection against scratching, abrasion and degradation of the thermochromic substance that may otherwise result from exposure to environmental influences at the work site such as harsh chemical exposure, grease, dirt, or airborne agents such as wind-entrained grit, sea salt or industrial aerosols. A glass or plastic covering of appropriate formulation may even block UV radiation to provide a measure of protection against UV degradation. The protective covering also provides a convenient substrate on which the thermochromic substance and non-thermochromic ink may be printed, making for a cost-effective fabrication. Bonding layer 33 may take the form of an adhesive layer applied to substrate 26 over the warning indicia and the associated layer 27 or 37. This assembly may be pre-fabricated with a removable backing over the adhesive layer. In the course of worklight assembly the adhesive backing is removed and the protective cover with pre-applied indicia and associated layer 27 or 37 is adhered in position, thus making for efficient worklight fabrication. Although the protective coverings in FIGS. 2A and 2B serve as the substrate on which the thermochromic and non-thermochromic substances are applied, as an alternative the thermal moderator may serve as the substrate.

If the transparent protective covering 26 carrying the warning indicia and associated background or thermochromic foreground layer is applied directly to the worklight surface without the use of thermal moderator 29, the surface will generally get too hot for many thermochromic inks, and this embodiment will generally require specialized formulations of thermochromic inks to give commercially acceptable performance. To avoid the necessity of specialized formulations and to permit the use of generally available lower-cost thermochromic inks, the embodiments of FIGS. 2A and 2B interpose the thermal moderator 29. The moderator is provided by a slab of material that is sufficiently thermally insulating that it is able to support a temperature gradient between the exterior worklight wall and the thermochromic substance. The thermal moderator serves to reduce the temperature applied to the thermochromic substance and to smooth out the effects of thermal hot spots or other non-uniform heating at the worklight surface. The thermal moderator thus serves to provide a more even temperature change over the full area of the thermal warning indicator and to permit the use thermochromic substances having a lower activation temperature, as well as moderating the range of temperature variation that the thermochromic substance will be exposed to. Thus, in many configurations the use of a thermal moderator will provide for a more stable and uniform operation and often a more cost-effective construction. In the examples of FIGS. 2A and 2B the thermal moderator may be provided by an epoxy-based board of the type used for printed circuit boards approximately one-sixteenth to one-eighth inch in thickness. The suitability of any proposed moderator material and its appropriate thickness are best determined empirically by simply trying out different sample materials. In view of the complex nature of heat flow through and about a worklight and the great variation in worklight geometry that is possible, as well as the mathematical complexity of thermal transfer characteristics of common materials, the suitability and proper thickness of a thermal moderator material is not amenable to theoretical calculation, but may readily be determined by trial.

In the embodiments of FIGS. 2A and 2B the thermal moderators 29 and the protective coverings 26 are held in place by bonding layers. As mentioned above, bonding layer 33 may be an adhesive layer. The Layer 34 need not be the same as layer 33. For example, moderator 29 may be epoxied in place while protective covering 26 is adhered in place by an adhesive layer. In general, any other convenient method may alternatively be used to secure the elements in place, such as by other bonding agents or even mechanically securing the elements with screws, rivets, heat welding or the like, provided only that the securement achieves a sufficiently uniform heat transfer from the worklight wall to thermal moderator and from thermal moderator to thermochromic substance.

Alternatively to the embodiments of FIGS. 2A and 2B, a thermal warning indicator may take the form of a thermochromic paint applied directly to the exterior worklight surface or to a portion thereof in a conspicuous location. It will generally be necessary here to select a thermochromic paint that provides a stable, non-blotchy color change over a temperature range that extends at least up to the maximum permissible temperature level set by the governing safety-certification agency. The uniformity or nonuniformity with which the worklight walls heat up and the appearance of isolated hot spots on the surface depend on the particular worklight design, its geometrical configuration, the size and positioning of the light bulb or bulbs, the positioning of vents and the like. Thus, the dimensions and disposition of the area over which the thermochromic paint may be applied and still give commercially acceptable performance will also vary from design to design. For a given worklight design a suitable area to be covered is preferably determined empirically.

The thermal warning indicator is illustrated here in a quartz halogen worklight because the hot-surface problem is particularly prevalent in such worklights. This is so because quartz halogen bulbs are designed to run hotter than comparable standard incandescent bulbs. Nevertheless, the invention disclosed herein may find use in any worklight that runs hot regardless of the particular form of light source employed. In addition, although embodiments have been described in which the thermochromic substance changes from opaque to transparent or from transparent to opaque, no limitation to these changes alone is intended. Rather, the particular color changes or combinations of color changes that may be used to give adequate warning are limited only by the available selection of thermochromic materials and the artistic creativity of the individual designer.

The above descriptions and drawings are given to illustrate and provide examples of various aspects of the invention in various embodiments. It is not intended to limit the invention only to these examples and illustrations. Given the benefit of the above disclosure, those skilled in the art may be able to devise various modifications and alternate constructions that although differing from the examples disclosed herein nevertheless enjoy the benefits of the invention and fall within the scope of the invention, which is to be defined by the following claims.

What is claimed is:

1. In a worklight having a housing including an interior portion for holding a halogen light source having a nominal power rating of at least 500 Watts, said housing having a front bezel defining an exit window for light from said halogen light source, said front bezel being heated under the action of said halogen light source to a temperature that is hot to human touch during normal operation of the worklight, the improvement comprising:

a warning indicator providing an indication that said bezel is hot to human touch, said indicator comprising:

a substantially transparent substrate;

a layer of thermochromic coating composition and warning indicia, both underlying said substrate in overlapping relation with one another;

said thermochromic coating composition being formulated to undergo a conspicuous color change in response to heat from said bezel during normal operation of said worklight;

said thermochromic coating composition and said warning indicia being structured and arranged so that said warning indicia are not visible until said thermochromic coating composition undergoes said conspicuous color change;

a thermal moderator having a thickness in the range of about one-sixteenth to one-eighth of an inch;

said bezel being formed with a recessed area, said moderator being disposed in said recessed area in thermal contact with said bezel, and said substrate with said underlying layer of thermochromic coating composition and warning indicia being disposed in said recessed area over and in thermal contact with said moderator such that said that said layer of thermochromic coating composition is in thermal communication with said bezel for undergoing said conspicuous color change in response to heat from said bezel.

2. In a worklight having a housing including an interior portion for holding a halogen light source having a nominal power rating of at least 500 Watts, said housing having a front bezel defining an exit window for light from said halogen light source, said front bezel being heated under the action of said halogen light source to a temperature that is hot to human touch during normal operation of the worklight, the improvement comprising:

a warning indicator providing an indication that said bezel is hot to human touch, said indicator comprising:
a substantially transparent substrate;
warning indicia and an associated layer, both underlying said substrate in overlapping relation with one another;
one of said associated layer and said warning indicia being formed of a thermochromic coating composition formulated to undergo a conspicuous color change in response to heat from said bezel during normal operation of said worklight;
said warning-indicia and said associated layer being structured and arranged so that said warning indicia are not conspicuously visible until said thermochromic coating composition undergoes said conspicuous color change;
a thermal moderator having a thickness in the range of about one-sixteenth to one-eighth of an inch;
said bezel being formed with a recessed area, said moderator being disposed in said recessed area in thermal contact with said bezel, and said substrate with said underlying warning indicia and associated layer being disposed in said recessed area over and in thermal contact with said moderator such that said thermochromic coating composition is in the thermal communication with said bezel for undergoing said conspicuous color change in response to heat from said bezel.

3. The worklight of claim 2, wherein said associated layer is formed of said thermochromic coating composition, and said thermochromic coating composition is normally substantially opaque at room temperature and turns substantially transparent in response to said heat from said bezel so as to expose said indicia during normal operation of said worklight.

4. The worklight of claim 2, wherein said warning indicia are formed of said thermochromic coating composition.

5. The worklight of claim 4, wherein said thermochromic coating composition is normally substantially transparent at room temperature and turns substantially opaque in response to said heat from said bezel so as to expose said indicia.

\* \* \* \* \*